United States Patent
Eggenreich et al.

(10) Patent No.: US 8,430,261 B2
(45) Date of Patent: Apr. 30, 2013

(54) CLOSURE COVER FOR TANKS UNDER INTERNAL PRESSURE, WITH A SAFETY FUNCTION, AND CLOSURE COVER FOR A FUEL TANK

(75) Inventors: Eduard Eggenreich, Weiz (AT); Stefan Feichtinger, Buechl (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 402 days.

(21) Appl. No.: 12/677,129

(22) PCT Filed: Sep. 11, 2008

(86) PCT No.: PCT/EP2008/062105
§ 371 (c)(1),
(2), (4) Date: Jun. 1, 2010

(87) PCT Pub. No.: WO2009/034149
PCT Pub. Date: Mar. 19, 2009

(65) Prior Publication Data
US 2011/0017734 A1    Jan. 27, 2011

(30) Foreign Application Priority Data
Sep. 11, 2007 (DE) .......................... 10 2007 043 033

(51) Int. Cl.
*B65D 51/16* (2006.01)

(52) U.S. Cl.
USPC ..... 220/303; 220/89.1; 220/202; 220/203.01; 220/203.05; 220/203.06; 220/203.09; 220/203.1; 220/203.23; 220/203.27; 220/316

(58) Field of Classification Search ................ 220/89.1, 220/202, 203.01, 203.05, 203.06, 203.09, 220/220/203.1, 203.17, 203.23, 203.27, 303, 220/316, DIG. 33
See application file for complete search history.

(56) References Cited

U.S. PATENT DOCUMENTS

| | | | |
|---|---|---|---|
| 5,924,590 A | 7/1999 | Jocic et al. | |
| 5,992,669 A | 11/1999 | Hagano et al. | |
| 6,729,271 B1 | 5/2004 | Reutter | |
| 7,380,681 B2 | 6/2008 | Reutter | |
| 2001/0047995 A1 | 12/2001 | Pozgainer et al. | |
| 2004/0000554 A1 | 1/2004 | Griffin et al. | |
| 2005/0051556 A1 | 3/2005 | Hagano | |
| 2005/0082289 A1* | 4/2005 | Reutter | 220/203.27 |

FOREIGN PATENT DOCUMENTS

| | | |
|---|---|---|
| DE | 19923775 | 11/2000 |
| DE | 20201082 | 6/2003 |
| EP | 0869024 | 10/1998 |

* cited by examiner

*Primary Examiner* — Anthony Staschick
*Assistant Examiner* — Madison L Poos
(74) *Attorney, Agent, or Firm* — Bachman & LaPointe, P.C.

(57) ABSTRACT

A closure cover for tanks under internal pressure, with a cover body (6) which can be fixed in a tank neck by rotation, and with a cover (14) which is provided with a handle (15) and is operatively connected to the cover body (6), and with a pressure control valve (40). A coupling device (22-28) is arranged between the cover body (6) and the cover (14) and, during the positive pressure which prevails in the fuel tank during normal operation, releases the rotational connection between the cover body (6) and the cover (14) such that the fuel tank cannot be opened, and in that a pressure control valve (40) is provided which opens when the positive pressure prevailing during normal operation is exceeded.

4 Claims, 3 Drawing Sheets

CLOSURE COVER FOR TANKS UNDER INTERNAL PRESSURE, WITH A SAFETY FUNCTION, AND CLOSURE COVER FOR A FUEL TANK

BACKGROUND OF THE INVENTION

The invention relates to closure covers for a tank under internal pressure, with a cover body which can be fixed in a tank neck by means of rotation, and with a cover which is provided with a handle and is operatively connected to the cover body. It also relates in particular to a closure cover for a motor vehicle fuel tank under slight excess pressure.

US 2001/0047995 describes a tank cover which closes off the filler neck of a motor vehicle fuel tank in a vapor tight manner; this being intended to minimize the emission of fuel vapors. Nevertheless, new tank covers are provided with pressure control valves that must close reliably and leaktightly and open only extremely infrequently.

For reasons connected with the engine, attention has recently focused on maintaining a slight excess pressure within the tank. To prevent fuel vapors from escaping, the tank must not be opened while the slight excess pressure provided for normal operation prevails therein, i.e. while the pressure is above a first threshold value. During normal operation, attention has to be paid to good sealing. This applies also to the pressure control valve, which opens at a second, higher, threshold value and must be arranged and designed accordingly.

SUMMARY OF THE INVENTION

The object is achieved by providing a closure cover for tanks under internal pressure, with a cover body which can be fixed in a tank neck by means of rotation, and with a cover which is provided with a handle and is operatively connected to the cover body, and with a pressure control valve, a driver ring acted upon by a compression spring being arranged between the cover body and the cover, one side of the driver ring being connected in a torsionally rigid manner to the cover and the other side being connectable in a torsionally rigid manner to the cover body as a function of the pressure prevailing within the tank, the pressure prevailing within the tank acting on the driver ring via a diaphragm and moving said driver ring against the force of the compression spring if the pressure exceeds a certain first threshold value, thus releasing the torsionally rigid connection, and a pressure control valve concentric with the cover body and having a further compression spring being fitted, said pressure control valve opening if the pressure within the tank exceeds a second, higher, threshold value, characterized in that the diaphragm, which is fixed by means of its outer rim on the cover body, has the form of an annulus which is supported on its side facing away from the driver ring by an annular disk and is fixed in a sealing manner on the cover body by means of its outer rim, arranged radially within the annular diaphragm is a valve body of a pressure control valve, the upper rim of which, which forms a flange, reaches around the diaphragm from the inside, with the result that the operative surface of said diaphragm is at least partially clamped between the flange and the annular disk when the valve is closed, for which purpose a further compression spring is provided between the annular disk and a spring plate arranged at the lower end of the valve body. The object is further achieved by providing a closure cover for a motor vehicle fuel tank under slight excess pressure, which can be fixed in the neck by turning, with a cover body and a cover seated thereon, characterized in that there is arranged between the cover body and the cover a coupling device which releases the rotational connection between the cover body and the cover at the excess pressure which prevails in the fuel tank during normal operation, thus preventing the fuel tank from being opened, and in that a pressure control valve is provided which opens if the excess pressure prevailing during normal operation is exceeded. At the excess pressure in the fuel tank prevailing during normal operation, the coupling device arranged between the cover body and the cover releases the rotational connection between the cover body and the cover, thus preventing the fuel tank from being opened. Only when the pressure has fallen below the first threshold value is it possible to open the tank.

The driver ring forms the axially movable part of the coupling and is actuated by an actuator which responds to the pressure difference between the interior of the tank and atmosphere. The driver ring is connected to the cover body and the cover, permanently to one of them and to the other only when the fuel tank is depressurized.

A diaphragm which is firmly connected to the cover body is preferably used as the actuator, a diaphragm having the advantage over a piston that it is leaktight. Its annular shape and the annular disk which supports it also enable it to interact with the pressure control valve, resulting in a design which is particularly simple and easy to assemble. The diaphragm thus exercises a dual function. Moreover, it is also possible as a result to make the pressure control valve sensitive and reliable.

DETAILED DESCRIPTION

Figure 1:
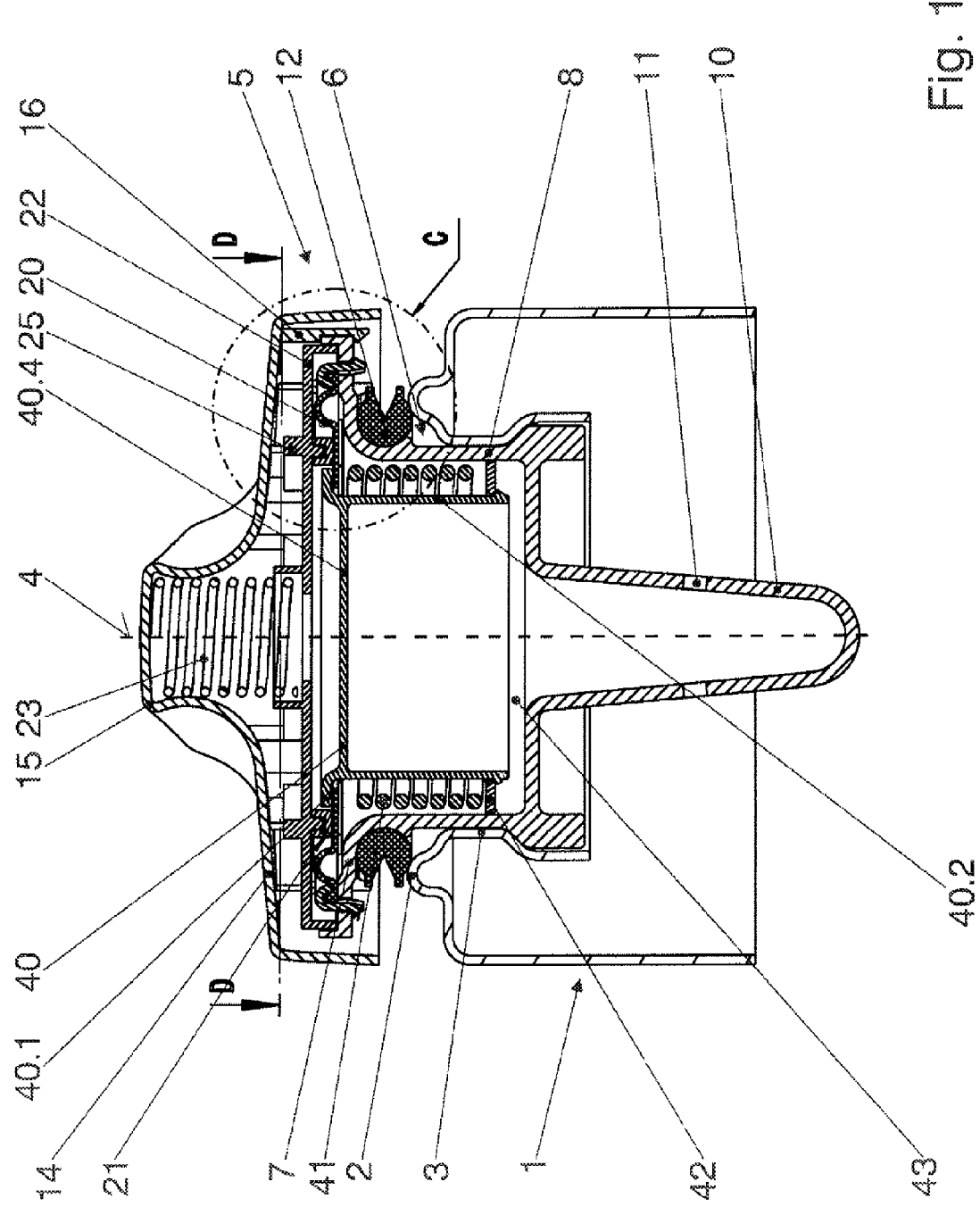
FIG. 1 shows an illustrative embodiment of a device according to the invention, in longitudinal section.

In FIG. 1, the closure cover according to the invention for a fuel tank (not shown) is denoted overall by 5. In operation, it is under a not very high internal pressure (approximately between 40 and 200 mbar) and has an upward projecting filler neck 1, on which the cover body 6 fits. In the text which follows, the terms "top", "bottom" and "height" etc. refer to the longitudinal axis 4 thereof. At its upper end, the neck 1 forms a seating surface 2 for a seal 12 and ends in a downward flanged collar 3, which forms a thread or—as in the present case—the female part of a bayonet joint to enable the closure cover to be fixed in the neck.

The closure cover 5 essentially comprises a cover body 6, a cover 14 and coupling parts according to the invention situated therebetween. The cover body 6 has the form of a dish 7 with an outer dish rim, adjoining which is a downward projecting hollow cylinder 8 having external threaded parts or male bayonet components, said hollow cylinder ending in this case in an extension pocket 10 having holes 11. The holes ensure that the pressure prevailing within the hollow cylinder 8 is the internal pressure of the tank.

The cover 14 with a handle 15 for turning the closure cover 5 is fitted over the dish 7 and has a number of snap hooks 16 distributed around its circumference, by means of which it is snapped onto the dish 7 but can be turned relative to the latter. A diaphragm 20 fixed in a leaktight manner on the cover body 6 and a driver ring 22 as a coupling device are provided in order to establish a rotational connection that is dependent on the pressure in the tank. When the internal pressure is greater than atmospheric pressure, it pushes the diaphragm 20 upward, and the diaphragm, for its part, pushes the driver ring 22 upward. The diaphragm 20 thus holds the driver ring 22 in a raised position, separated from a slide ring 21, against the force of a compression spring 23 arranged above it. The compression spring 23 is designed for a first threshold value of the internal pressure, above which the cover body 5 must not be opened. The selective rotational connection is explained with reference to FIG. 2.

Figure 2:
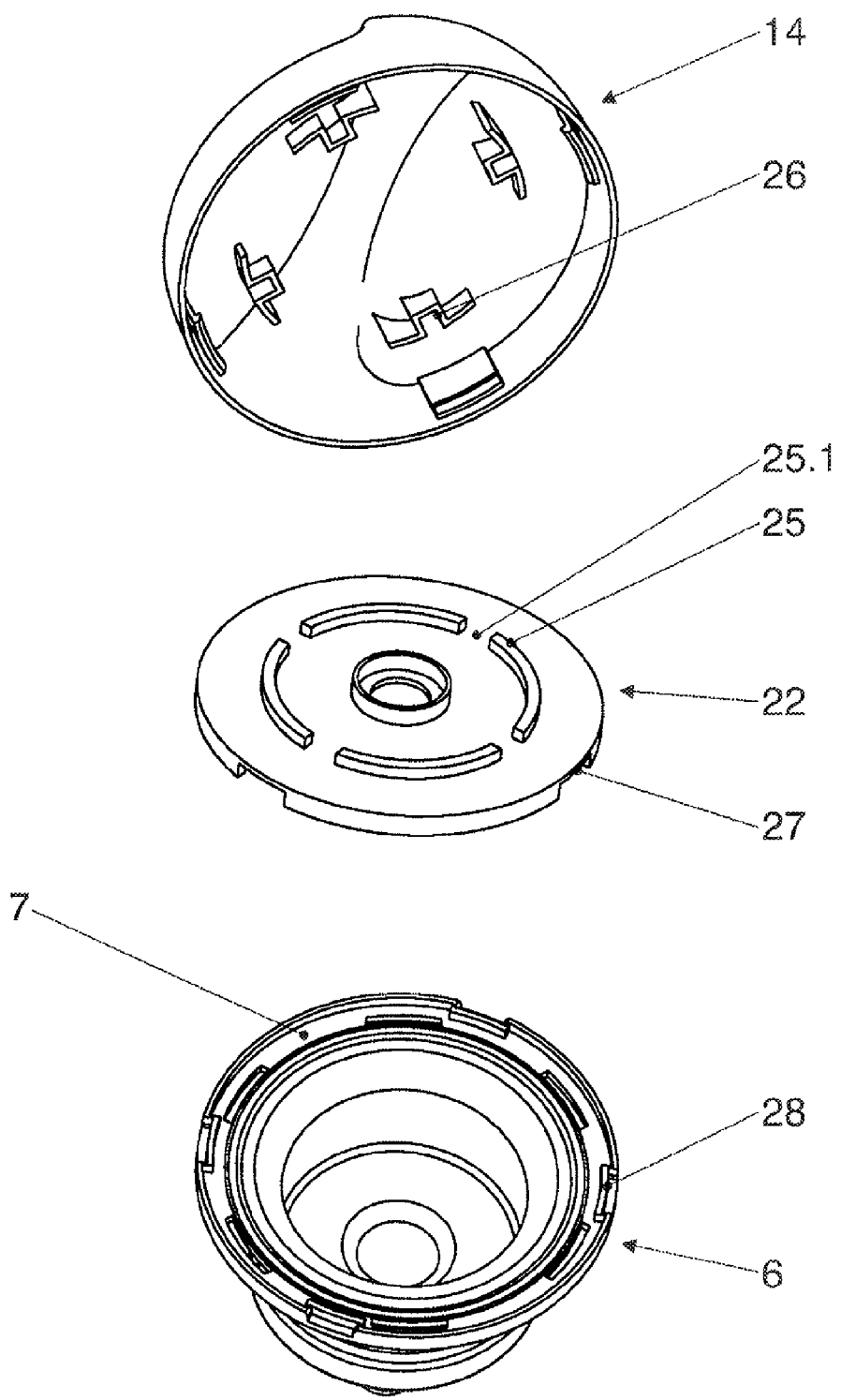
FIG. 2 shows an exploded representation relating to FIG. 1.

In FIG. 2, the cover body 6 is shown from above, and the cover 14 is shown from below, with the driver ring 22 in between. On its upper side, said driver ring 22 has first ribs 25 arranged in a circle with gaps 25.1. The cover 14 has a corresponding number of second ribs 26 on its inside, said ribs in this case being in the form of lugs which engage in the gaps 25.1 irrespective of the vertical position of the driver ring 22 (and thus irrespective of the internal pressure). On its downward flanged rim 22.1 (i.e. on its underside), the driver ring 22 has a number of recesses 27, into which inward directed projections 28 on the outer rim of the dish 7 of the cover body 6 engage in the lowered position of said driver ring. The recesses 27 are so shallow that the projections 28 disengage as soon as the internal pressure exceeds the first threshold value (40 mbar, for example) and thus raises the diaphragm 20, whereupon the rotational connection is released.

Figure 3:
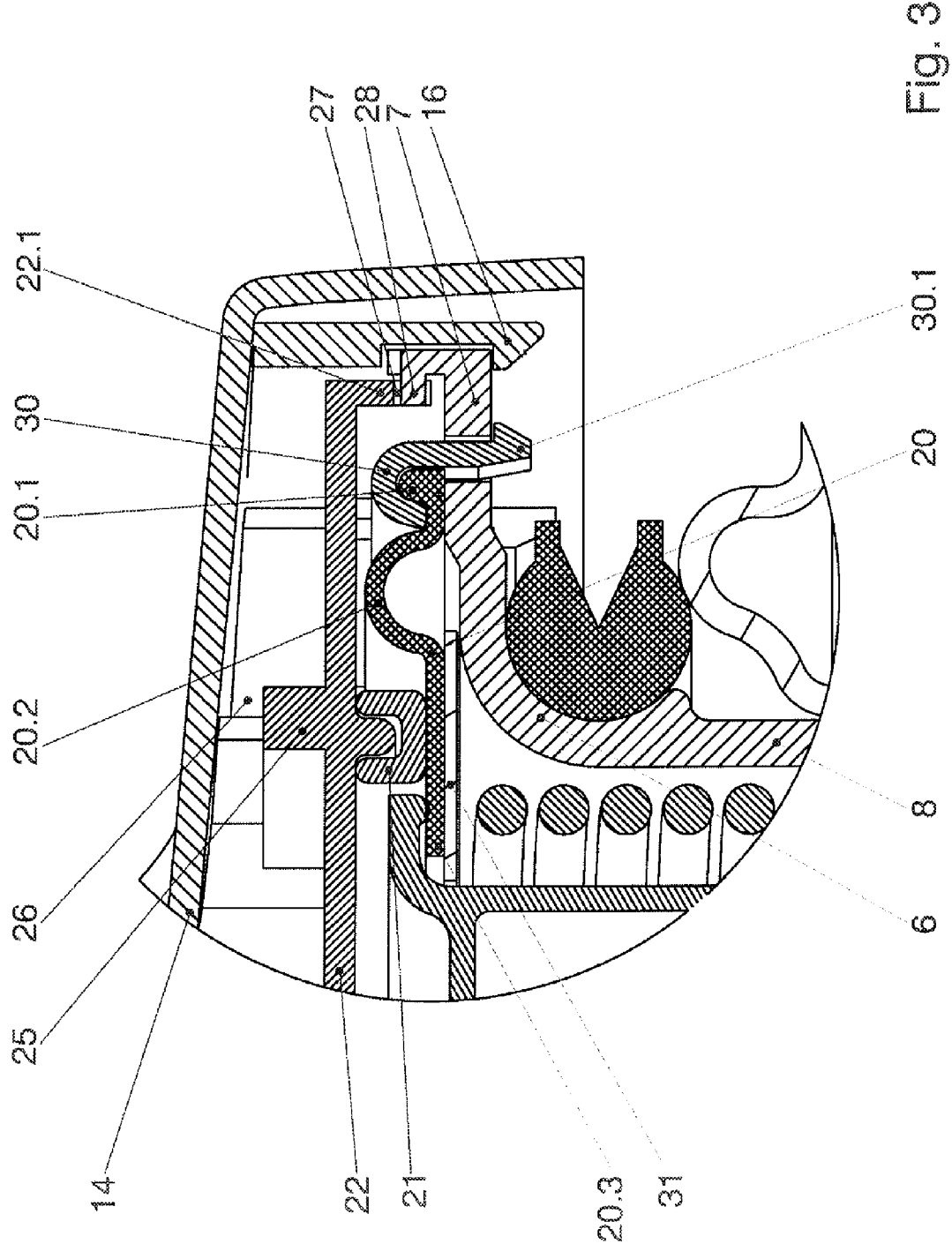
FIG. 3 shows the detail C in FIG. 1 on an enlarged scale.

The components 25-28 which establish the selective rotational connection can be seen better in FIG. 3. On its circular outer rim, the diaphragm 20 has an all-round bead 20.1, which is held leaktightly on the dish-shaped part of the cover body 6 by a clamping ring 30. The clamping ring 30 is again snap-fitted to the cover body 6 by means of a number of snap hooks 30.1. Adjoining the bead 20.1 toward the inside is a bellows-like torus 20.2, within which the operative surface 20.3, the diaphragm proper, is set up. This is an annulus with a disk 31 resting against its underside to form an additional pressure control valve, as described below.

Referring once more to FIG. 1: the pressure control valve is to a large extent accommodated in the space 43 within the cover housing. It is formed by a valve body 40. This is a downward extending cylinder 40.2 which is closed off at the top by a dividing wall 40.4 with a large surface area and at the upper edge of which a flange 40.1 projects outward, partially overlapping the operative surface 20.3 of the annular diaphragm 20 from the inside/from below. At the bottom, the cylinder 40.2 ends in a widened portion, on which a spring plate 42 is supported. Seated between the spring plate 42 and the disk 31 on the underside of the diaphragm 20 is a further compression spring 41, which pushes the flange 40.1 of the valve body 40 onto the diaphragm 20. The valve body 40 can thus follow the deformation of the diaphragm 20 without causing the pressure control valve to leak or even open.

Only when the pressure within the tank exceeds a second, higher, threshold value (400 mbar, for example) does the pressure acting on the large-area dividing wall 40.4 overcome the force of the further compression spring 41, the flange 40.1 rise from the diaphragm 20, and the pressure control valve open, allowing the outflowing fuel vapor to escape through the hole 22.1 in the driver ring 22. In accordance with the higher threshold value, the further compression spring 41 is stronger than compression spring 23.

Various embodiments that differ from the embodiment described lie within the scope of the invention. Thus, the releasable rotational connection can also be provided between the driver ring 22 and the cover 14 (the arrangement thus being reversed), for which purpose the coupling elements 25 to 28 are to be redesigned accordingly. In general, the coupling elements can be embodied in any way desired, just as long as they establish a permanent rotational connection on one side of the driver ring 22 and a temporary rotational connection on the other side of the latter as a function of the vertical position thereof.

The invention claimed is:

1. A closure cover for tanks under internal pressure, comprising a cover body (6) which can be fixed in a tank neck by means of rotation, a cover (14) provided with a handle (15) operatively connected to the cover body (6), and a pressure control valve, wherein:
    a) a driver ring (22) acted upon by a compression spring (23) being arranged between the cover body (6) and the cover (14), one side of the driver ring being connected in a torsionally rigid manner to the cover (14) and the other side being connectable in a torsionally rigid manner to the cover body (6) as a function of the pressure prevailing within the tank,
    b) the pressure prevailing within the tank acting on the driver ring (22) via a diaphragm (20) and moving said driver ring against a force of the compression spring (23) if the pressure exceeds a certain first threshold value, thus releasing the torsionally rigid connection, and
    c) a pressure control valve (40) concentric with the cover body (6) and having a further compression spring (41) being fitted, said pressure control valve opening if the pressure within the tank exceeds a second, higher, threshold value, wherein
    d) the diaphragm (20), which is fixed by means of its outer rim (20.1) on the cover body (6), has a form of an annulus which is supported on its side facing away from the driver ring (22) by an annular disk (31) and is fixed in a sealing manner on the cover body (6) by means of its outer rim (20.1),
    e) arranged radially within the annular diaphragm (20) is a valve body (40) of a pressure control valve, an upper rim of which, which forms a flange (40.1), reaches around the diaphragm (20) from inside, with a result that the operative surface (20.3) of said diaphragm is at least partially clamped between the flange (40.1) and the annular disk (31) when the valve is closed wherein, from the flange (40.1) downward, the valve body (40) forms a cylinder (40.2) which is closed at the top and which is accommodated by a cylindrical space (43) formed within the cover body (6),
    f) for which purpose a further compression spring (41) is provided between the annular disk (31) and a spring plate (42) arranged at the lower end of the valve body (40).

2. The closure cover as claimed in claim 1, wherein a clamping ring (30) clipped firmly to the cover body (6) is provided for sealed fixing of the diaphragm (20) on said cover body (6).

3. The closure cover as claimed in claim 2, wherein a slide ring (21) is arranged between the diaphragm (20) and an underside of the driver ring (22).

4. The closure cover as claimed in claim 1, wherein the driver ring (22) has on its upper side first ribs (25), which engage in a coupling manner in second ribs (26) in the cover (14), irrespective of a vertical position of the driver ring, and in that the driver ring (22) has on its underside recesses (27) in which projections (28) on the cover body (6) engage only when the driver ring (22) is in its lowest position.

* * * * *